United States Patent
Kodama et al.

(10) Patent No.: US 6,984,704 B2
(45) Date of Patent: Jan. 10, 2006

(54) FLUORINATED COMPOUND, FLUOROPOLYMER AND PROCESS FOR ITS PRODUCTION

(75) Inventors: Shun-ichi Kodama, Kanagawa (JP); Isamu Kaneko, Kanagawa (JP); Osamu Yokokoji, Kanagawa (JP); Shinji Okada, Kanagawa (JP); Yoko Takebe, Kanagawa (JP); Yasuhide Kawaguchi, Kanagawa (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 11/059,695

(22) Filed: Feb. 17, 2005

(65) Prior Publication Data

US 2005/0143542 A1    Jun. 30, 2005

Related U.S. Application Data

(63) Continuation of application No. PCT/JP03/10590, filed on Aug. 21, 2003.

(30) Foreign Application Priority Data

Aug. 21, 2002 (JP) ............................. 2002-240009

(51) Int. Cl.
*C08F 36/20* (2006.01)
*C08F 114/18* (2006.01)

(52) U.S. Cl. ................... 526/250; 526/249; 526/308; 526/252; 526/253

(58) Field of Classification Search ................ 526/250, 526/308
See application file for complete search history.

(56) References Cited

U.S. PATENT DOCUMENTS 5,830,966 A * 11/1998 Thang et al. ............... 526/321
6,733,952 B2 * 5/2004 Kaneko et al. ............ 430/270.1
6,815,146 B2   11/2004 Okada et al.
6,818,258 B2 * 11/2004 Kaneko et al. ............. 427/553
2003/0148213 A1 * 8/2003 Kaneko et al. ............ 430/270.1
2004/0013970 A1 * 1/2004 Okada et al. .............. 430/270.1
2004/0132940 A1 * 7/2004 Kaneko et al. ............. 526/252

FOREIGN PATENT DOCUMENTS

| JP | 2003-292547 | 10/2003 |
| WO | WO 02/64648 | 8/2002 |
| WO | WO 02/65212 | 8/2002 |

* cited by examiner

*Primary Examiner*—David W. Wu
*Assistant Examiner*—I. Wu
(74) *Attorney, Agent, or Firm*—Oblon, Spivak, McClelland, Maier & Neustadt, P.C.

(57) ABSTRACT

To provide a fluoropolymer which has a high concentration of functional groups to provide adequate characteristics of the functional groups and which brings about no decrease of Tg.

A fluoropolymer having monomer units formed by cyclopolymerization of a functional group-containing fluorinated diene represented by the formula (1):

$$CFR^1=CR^2-Q-CR^3=CHR^4 \qquad (1)$$

wherein each of $R^1$ to $R^4$ which are independent of one another, represents a hydrogen atom, a fluorine atom, an alkyl group having at most 8 carbon atoms, or an alicyclic hydrocarbon group, and at least one of them is an alicyclic hydrocarbon group, provided that hydrogen atoms in the alkyl group or the alicyclic hydrocarbon group may be substituted by a fluorine atom, an alkyl group or a fluoroalkyl group; and Q represents a bivalent organic group having a blocked acidic group capable of developing an acidic group by an acid or a group capable of being converted into such a blocked acidic group.

10 Claims, No Drawings

FLUORINATED COMPOUND, FLUOROPOLYMER AND PROCESS FOR ITS PRODUCTION

TECHNICAL FIELD

The present invention relates to a novel fluorinated compound, a polymer having an improved fluorinated cyclic structure and having functional groups and a process for its production.

BACKGROUND ART

As fluoropolymers having functional groups, functional group-containing fluoropolymers are known which are used for fluorinated ion exchange membranes, curable fluorinated resin coating materials, etc. However, they are all basically straight chained polymers, and they are obtainable by copolymerization of a fluoroolefin represented by tetrafluoroethylene with a monomer having a functional group.

Further, a polymer containing functional groups and having a fluorinated alicyclic structure in its main chain, is also known. As a method for introducing functional groups to the polymer having a fluorinated alicyclic structure in its main chain, a method of utilizing terminal groups of a polymer obtained by polymerization, a method of subjecting a polymer to high temperature treatment to oxidize and decompose side chains or terminals of the polymer to form functional groups, or a method of copolymerizing a monomer having a functional group, if necessary, followed by treatment such as hydrolysis to introduce functional groups, is, for example, known (JP-A-4-189880, JP-A-4-226177 or JP-A-6-220232).

The above-mentioned methods are available as methods for introducing functional groups to a polymer having a fluorinated alicyclic structure in its main chain. However, the method for introducing functional groups by treating the terminal groups of the polymer, has a drawback that the functional group concentration is low, and no adequate characteristics of the functional groups can be obtained. Whereas, by the method for introducing functional groups by copolymerizing a monomer having a functional group, there will be a problem such that if the functional group concentration is increased, the mechanical properties tend to decrease due to a decrease of the glass transition temperature (Tg).

It is an object of the present invention to provide a fluoropolymer which has a high concentration of functional groups to provide adequate characteristics of the functional groups and which brings about no decrease of Tg, a process for its production and a fluorinated compound for production of such a polymer.

DISCLOSURE OF THE INVENTION

The present invention is the following invention relating to a fluoropolymer having functional groups or functional group-containing organic groups directly bonded to fluorinated alicyclic rings.

A fluoropolymer having monomer units formed by cyclopolymerization of a functional group-containing fluorinated diene represented by the formula (1):

$$CFR^1=CR^2-Q-CR^3=CHR^4 \quad (1)$$

wherein each of $R^1$, $R^2$, $R^3$ and $R^4$ which are independent of one another, represents a hydrogen atom, a fluorine atom, an alkyl group having at most 8 carbon atoms, or an alicyclic hydrocarbon group, and at least one of them is an alicyclic hydrocarbon group, provided that part of carbon atoms in the alkyl group or the alicyclic hydrocarbon group may be substituted by a hetero atom or a carbonyl group, and part of hydrogen atoms in the alkyl group or the alicyclic hydrocarbon group may be substituted by a fluorine atom, an alkyl group or a fluoroalkyl group; and Q represents a bivalent organic group having a blocked acidic group capable of developing an acidic group by an acid or a group capable of being converted into such a blocked acidic group.

The above fluoropolymer is produced by cyclopolymerizing a fluorinated diene represented by the formula (1) in the presence of e.g. a radical polymerization initiation source. The present invention is also the following invention relating to such a process.

A process for producing a fluoropolymer, which comprises cyclopolymerizing a fluorinated diene represented by the above formula (1).

The fluoropolymer of the present invention can readily be made to be a polymer having a high Tg or can be made to be a polymer having a concentration of functional groups sufficient to exhibit their characteristics.

BEST MODE FOR CARRYING OUT THE INVENTION

By the present invention, it has been made possible to produce a cyclized fluoropolymer having functional groups in side chains of the cyclic structure. Namely, the present invention provides a polymer having monomer units formed by cyclopolymerization of a functional group-containing fluorinated diene represented by the formula (1), and a process for its production:

$$CFR^1=CR^2-Q-CR^3=CHR^4 \quad (1)$$

wherein each of $R^1$, $R^2$, $R^3$ and $R^4$ which are independent of one another, represents a hydrogen atom, a fluorine atom, an alkyl group having at most 8 carbon atoms, or an alicyclic hydrocarbon group, and at least one of them is an alicyclic hydrocarbon group, provided that part of carbon atoms in the alkyl group or the alicyclic hydrocarbon group may be substituted by a hetero atom or a carbonyl group, and part of hydrogen atoms in the alkyl group or the alicyclic hydrocarbon group may be substituted by a fluorine atom, an alkyl group or a fluoroalkyl group; and Q represents a bivalent organic group having a blocked acidic group capable of developing an acidic group by an acid or a group capable of being converted into such a blocked acidic group.

By the cyclopolymerization of the fluorinated diene represented by the formula (1) (hereinafter referred to as the fluorinated diene (1)), the following monomer units (a) to (c) are considered to be formed, and from the results of the spectroscopic analyses, etc., the cyclized polymer of the fluorinated diene (1) is considered to be a polymer having a structure comprising monomer units (b), monomer units (c) or both of them, as the main monomer units. Further, the main chain of this cyclized polymer is meant for a carbon chain constituted by carbon atoms which constitute polymerizable unsaturated bonds (in the case of the fluorinated diene (1), the four carbon atoms which constitute polymerizable unsaturated double bonds).

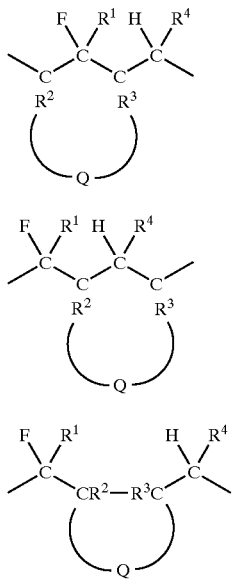

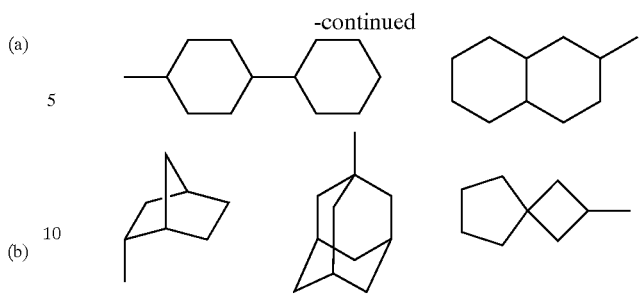

In the formula (1), each of $R^1$, $R^2$, $R^3$ and $R^4$ which are independent of one another, represents a hydrogen atom, a fluorine atom, an alkyl group having at most 8 carbon atoms, or an alicyclic hydrocarbon group, and at least one of them is an alicyclic hydrocarbon group. The alicyclic hydrocarbon group is preferably an alicyclic hydrocarbon group having at least 4 carbon atoms, more preferably a saturated hydrocarbon group having at least 4 carbon atoms, particularly preferably a saturated hydrocarbon group having 4 to 10 carbon atoms. Part of carbon atoms in the alkyl group or the alicyclic hydrocarbon group may be substituted by a hetero atom or a carbonyl group, and part of hydrogen atoms in the alkyl group or the alicyclic hydrocarbon group may be substituted by a fluorine atom, an alkyl group or a fluoroalkyl group.

Each of $R^1$ and $R^2$ is preferably a fluorine atom or a trifluoromethyl group. Each of $R^3$ and R4 is preferably a hydrogen atom, a methyl group or an alicyclic hydrocarbon group, and at least one of them is an alicyclic hydrocarbon group.

The alicyclic hydrocarbon group is preferably a hydrocarbon group having at least one cyclic structure, more preferably a saturated hydrocarbon group having at least one cyclic structure, and it includes the following monocyclic saturated hydrocarbon groups such as a cyclobutyl group, a cycloheptyl group and a cyclohexyl group, bicyclic saturated hydrocarbon groups such as a 4-cyclohexylcyclohexyl group, polycyclic saturated hydrocarbon groups such as a 1-decahydronaphthyl group and 2-decahydronaphthyl group, crosslinked cyclic saturated hydrocarbon groups such as a 1-norbornyl group and a 1-adamantyl group, spiro hydrocarbon groups such as a spiro[3,4]octyl group:

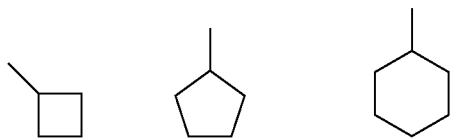

Further, instead of part of carbon atoms of the above alicyclic hydrocarbon group, a hetero atom such as an oxygen atom, a nitrogen atom or a sulfur atom or a carbonyl group may be in the ring, and part of hydrogen atoms in the alicyclic hydrocarbon group may be substituted by a fluorine atom, an alkyl group (preferably having from 1 to 6 carbon atoms) or a fluoroalkyl group (preferably having from 1 to 6 carbon atoms).

Q represents a bivalent organic group having a blocked acidic group capable of developing an acidic group (hereinafter referred to simply as "blocked acidic group") or a group capable of being converted into such a blocked acidic group (hereinafter referred to as "precursor group"). When Q is a bivalent organic group having a precursor group, the precursor group in the polymer is converted to a blocked acidic group after cyclopolymerization of the fluorinated diene (1).

The fluoropolymer of the present invention has a blocked acidic group. When the fluorinated diene (1) has a blocked acidic group, it is cyclopolymerized to form the fluoropolymer, and when the fluorinated diene (1) has a precursor group, it is cyclopolymerized to form a polymer, the precursor group of which is converted into a blocked acidic group to form the fluoropolymer. The precursor group may be an acidic group or a group capable of being converted into an acidic group. The acidic group is capable of being converted into a blocked acidic group by a reaction with a blocking agent. The group capable of being converted into an acidic group may be a blocked acidic group other than the aimed blocked acidic group. It may be converted into the aimed blocked acidic group by conversion of the blocked moiety. The proportion of blocked groups (proportion of the blocked acidic groups to the total of blocked acidic groups and non-blocked acidic groups) of the fluoropolymer in the present invention is preferably from 10 to 100 mol %, particularly preferably from 10 to 90 mol %.

The shortest distance between both terminal bonds in Q is preferably from 2 to 6 atoms, particularly preferably from 2 to 4 atoms, as represented by number of atoms (hereinafter, the atomic chain constituting this shortest distance will be referred to as the main portion). The atoms constituting the main portion may be composed solely by carbon atoms or may be composed of carbon atoms and other bivalent or higher valent atoms. The bivalent or higher valent atoms other than the carbon atoms, may, for example, be an oxygen atom, a sulfur atom or a nitrogen atom substituted by a monovalent group, particularly preferably an oxygen atom. The oxygen atom, etc., may be present at either one or both of the two terminals, or may be present between carbon atoms in Q.

In the main portion in Q, at least one carbon atom is present, and to at least one carbon atom constituting the main portion in Q, a blocked acidic group, a precursor group or an organic group containing a blocked acidic group or a precursor group, is bonded. Other than such specific groups, a hydrogen atom or a halogen atom (particularly preferably a fluorine atom) may be bonded to the carbon atom, etc. constituting the main portion, or an alkyl group, a fluoroalkyl group, an alkoxy group, an aryl group or other organic group, may be bonded, and the carbon number of such an organic group is preferably from 1 to 6.

The acidic group may be an acidic hydroxyl group, a carboxylic acid group or a sulfonic acid group, particularly preferably an acidic hydroxyl group or a carboxylic acid group, most preferably an acidic hydroxyl group. The acidic hydroxyl group is a hydroxyl group exhibiting acidic properties, and it may, for example, be a hydroxyl group directly bonded to the ring of an aryl group (phenolic hydroxyl group), a hydroxyl group bonded to a carbon atom to which a perfluoroalkyl group (preferably a perfluoroalkyl group having 1 to 2 carbon atoms) is bonded, a hydroxyl group bonded to a difluoromethylene group or a hydroxyl group bonded to a tertiary carbon atom. It is particularly preferably a hydroxyl group bonded to a carbon atom to which one or two perfluoroalkyl groups are bonded. When the perfluoroalkyl group is a trifluromethyl group, preferred is a hydroxyl group in a bivalent group represented by the following formula (d-1) (i.e. a hydroxyl group in a hydroxytrifluoromethyl methylene group) or a hydroxyl group in a monovalent group represented by the following formula (d-2) or (d-3) (i.e. a hydroxyl group in a 1-hydroxy-1-trifluoromethyl-2,2,2-trifluoroethyl group or a 1-hydroxy-1-methyl-2,2,2-trifluoroethyl group):

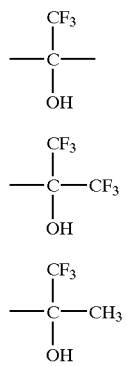

The blocked acidic group is obtained by reacting the above acidic group with a blocking agent. The blocked acidic group is a group capable of being converted into an acidic group in the reaction with an acid. When the acidic group is a carboxylic acid group or a sulfonic acid group, it may be reacted with a blocking agent such as an alkanol to substitute the hydrogen atom in the acidic group with e.g. an alkyl group, and converted into a blocked acidic group.

When the acidic group is an acidic hydroxyl group, the blocked acidic group is preferably a blocked acidic group obtained by substituting the hydrogen atom in the acidic hydroxyl group with an alkyl group, an alkoxycarbonyl group, an acyl group or an ether group having an alicyclic hydrocarbon group. The preferred alkyl group to substitute the hydrogen atom in the hydroxyl group may be an alkyl group having from 1 to 6 carbon atoms, which may have a substituent (such as an aryl group or an alkoxy group). Specific examples of such an alkyl group include an alkyl group having at most 6 carbon atoms (such as a tert-butyl group ($t-C_4H_9$)), an alkyl group substituted by an aryl group, having 7 to 20 carbon atoms in total (such as a benzyl group, a triphenylmethyl group, a p-methoxybenzyl group or a 3,4-dimethoxybenzyl group), and alkoxyalkyl group having at most 8 carbon atoms in total (such as a methoxymethyl group, a (2-methoxyethoxy)methyl group or a benzyloxymethyl group). A preferred alkoxycarbonyl group to substitute the hydrogen atom in the hydroxyl group may be an alkoxycarbonyl group having at most 8 carbon atoms, such as a tert-butoxycarbonyl group ($—COO(t-C_4H_9)$). A preferred acyl group to substitute the hydrogen atom in the hydroxyl group may be an acyl group having at most 8 carbon atoms in total, such as a pivaloyl group, a benzoyl group or an acetyl group. A preferred ether group having an alicyclic hydrocarbon group to substitute the hydrogen atom in the hydroxyl group may be a 2-tetrahydropyranyl group, a cyclohexyloxymethyl group, an adamantyloxymethyl group, a tricyclodecanyl oxymethyl group or an isobornyl oxymethyl group, or the following groups.

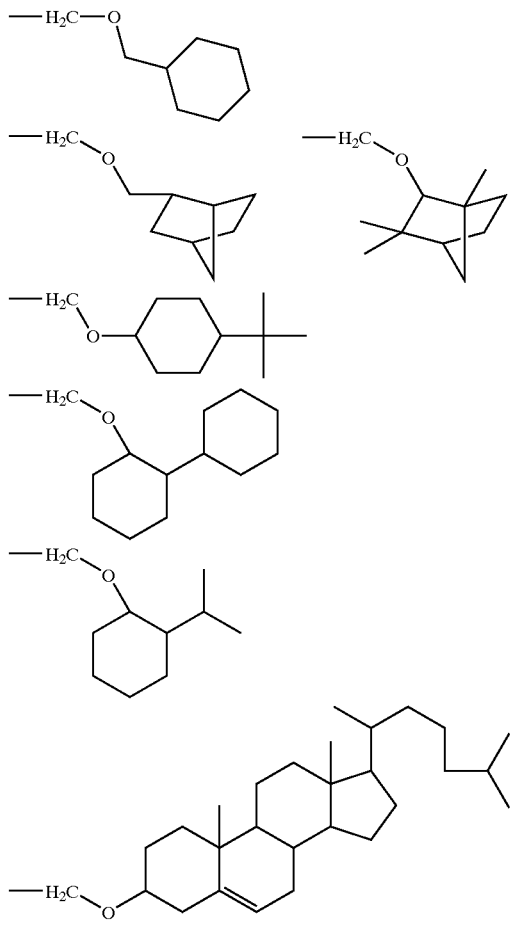

To block the acidic hydroxyl group, an alcohol, a carboxylic acid or an active derivative thereof is reacted therewith. The active derivative thereof may be an alkyl halide, an acid chloride, an acid anhydride, a chlorocarbonate, a dialkyl dicarbonate (such as di-tert-butyl dicarbonate) or 3,4-dihydro-2H-pyran. Specific examples of a reagent useful to block the hydroxyl group are disclosed in Handbook of Reagents for Organic Sybthesis: Activating Agents and Protecting Groups, edited by A. J. Pearson and W. R. Roush, John Wiley & Sons (1999).

The acidic group is particularly preferably an acidic hydroxyl group, and the blocked acidic group is preferably a blocked acidic hydroxyl group. As specific examples of the blocked acidic hydroxyl group, O(t-C$_4$H$_9$), OCH$_2$OCH$_3$, OCOO(t-C$_4$H$_9$), OCH(CH$_3$)OC$_2$H$_5$, a 2-tetrahydropyranyloxy group and an acidic hydroxyl group having the following protective groups:

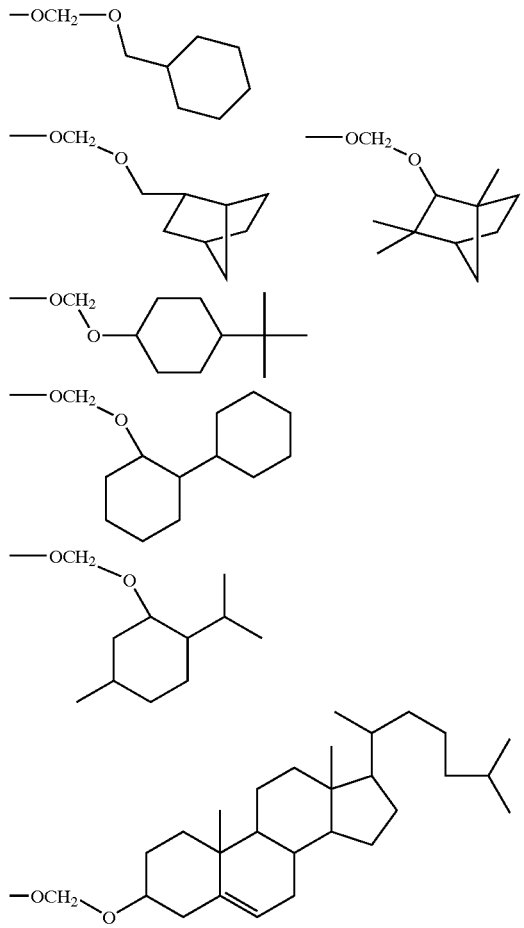

Q is preferably a bivalent organic group represented by the following formula (7), and accordingly the fluorinated diene (1) is preferably a compound represented by the formula (8) (R$^1$, R$^2$, R$^3$ and R$^4$ are as defined above).

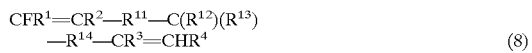

wherein each of R$^{11}$ and R$^{14}$ which are independent of each other, represents a single bond, an oxygen atom, an alkylene group having at most 3 carbon atoms, which may have an ethereal oxygen atom, or a fluoroalkylene group having at most 3 carbon atoms, which may have an ethereal oxygen atom, R$^{12}$ represents a hydrogen atom, a fluorine atom, an alkyl group having at most 3 carbon atoms, or a fluoroalkyl group having at most 3 carbon atoms, and R$^{13}$ represents a blocked acidic group, an acidic group or a monovalent organic group having a blocked acidic group or an acidic group.

As each of R$^{11}$ and R$^{14}$, the alkylene group is preferably —(CH$_2$)$_m$—, and the fluoroalkylene group is preferably —(CF$_2$)$_n$—(each of m and n is an integer of from 1 to 3). As the combination of R$^{11}$ and R$^{14}$, preferably both are such groups (in such a case, m+n is preferably 2 or 3), or one of them is such a group, and the other is a single bond or an oxygen atom. As R$^{12}$, the alkyl group is preferably a methyl group and the fluoroalkyl group is preferably a trifluoromethyl group.

R$^{13}$ in the case of monovalent organic group is preferably an organic group having at most 8 carbon atoms, preferably a group wherein the moiety other than the blocked acidic group or the acidic group is a hydrocarbon group or a fluorohydrocarbon group. It is particularly preferably an alkyl group having from 2 to 6 carbon atoms, a fluoroalkyl group having from 2 to 6 carbon atoms or a phenylalkyl group having from 7 to 9 carbon atoms (provided that the blocked acidic group or the like is bonded to the phenyl group), each having a blocked acidic group or an acidic group. As specific R$^{13}$ the following groups may be mentioned (provided that k represents an integer of from 1 to 6, and X represents a blocked acidic group or an acidic group):

—(CH$_2$)$_k$—X,

—(CH$_2$)$_k$C(CF$_3$)$_2$—X,

—(CH$_2$)$_k$C(CH$_3$)$_2$—X,

—(CH$_2$)$_k$C(CF$_3$)(CH$_3$)—X,

—(CH$_2$)$_k$CH(CH$_3$)—X,

—(CH$_2$)$_k$C$_6$H$_4$—X

The preferred fluorinated diene (1) are compounds represented by the following formulae:

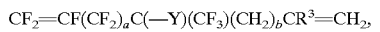

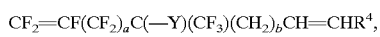

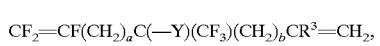

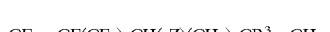

Among the above eight compounds, each of R$^3$ and R$^4$ represents an alicyclic hydrocarbon group, Y represents X$^1$ or —R$^{15}$—X$^1$, Z represents —R$^{15}$—X$^1$, and X$^1$ represents OH, O(t-C$_4$H$_9$), OCH$_2$OCH$_3$, OCOO(t-C$_4$H$_9$), OCH(CH$_3$)OC$_2$H$_5$, a 2-tetrahydropyranyloxy group or the following ether groups:

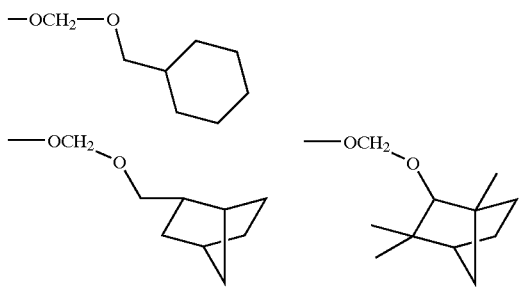

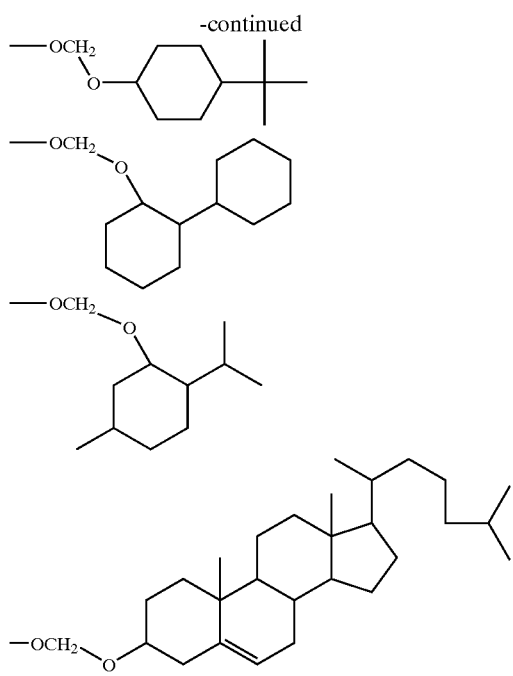

$R^{15}$ represents $(CH_2)_pC(CF_3)_2$, $(CH_2)_pC(CF_3)(CH_3)$ or $(CH_2)_pC_6H_4$. Each of a and b which are independent of each other represents an integer of from 0 to 3 (provided that a+b is from 1 to 3), p represents an integer of from 1 to 3. Most preferred $X^1$ is $O(t-C_4H_9)$, $OCH_2OCH_3$, $OCOO(t-C_4H_9)$, $OCH(CH_3)OC_2H_5$, a 2-tetrahydropyranyloxy group or a methoxymethoxy group, and most preferred $R^{15}$ is $(CH_2)_pC(CF_3)_2$. Each of a and b is most preferably 1.

The most preferred fluorinated diene (1) is a compound represented by the formula (9), (10), (11) or (12):

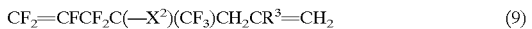

$CF_2=CFCF_2C(-X^2)(CF_3)CH_2CR^3=CH_2$ (9)

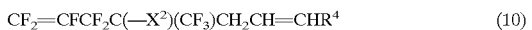

$CF_2=CFCF_2C(-X^2)(CF_3)CH_2CH=CHR^4$ (10)

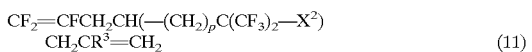

$CF_2=CFCH_2CH(-(CH_2)_pC(CF_3)_2-X^2)CH_2CR^3=CH_2$ (11)

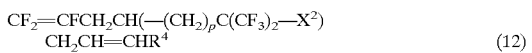

$CF_2=CFCH_2CH(-(CH_2)_pC(CF_3)_2-X^2)CH_2CH=CHR^4$ (12)

wherein $R^3$ and $R^4$ represents an alicyclic hydrocarbon group, $X^2$ represents $O(t-C_4H_9)$, $OCH_2OCH_3$, $OCOO(t-C_4H_9)$, $OCH(CH_3)OC_2H_5$ or a 2-tetrahydropyranyloxy group, and p represents an integer of from 1 to 3.

The fluoropolymer of the present invention contains monomer units formed by cyclopolymerization of the fluorinated diene represented by the formula (1), as essential components, but may further contain monomer units derived from other radical polymerizable monomers within a range not to impair the characteristics. The proportion of such other monomer units is preferably at most 30 mol %, particularly preferably at most 15 mol %. Further, the fluoropolymer of the present invention may contain at least two types of the fluorinated diene units represented by the formula (1).

Such monomer units may, for example, be monomer units derived from an α-olefin such as ethylene, propylene or isobutylene, a fluorinated olefin such as tetrafluoroethylene or hexafluoropropylene, a fluorinated cyclic monomer such as perfluoro(2,2-dimethyl-1,3-dioxol), a cyclopolymerizable perfluorodiene such as perfluoro(butenyl vinyl ether), an acryl ester such as methyl acrylate or ethyl methacrylate, a vinyl ester such as vinyl acetate, vinyl benzoate or vinyl adamantate, a vinyl ether such as ethyl vinyl ether or cyclohexyl vinyl ether, a cyclic olefin such as cyclohexene, norbornene or norbornadiene, maleic anhydride, or vinyl chloride.

Further, a monomer having a blocked acidic group may also be used adjunctly. A (meth)acrylate such as tert-butyl acrylate, tert-butyl methacrylate or tetrahydropyranyl acrylate, a vinyl ether such as tert-butyl vinyl ether, or $CH_2=CHCH_2C(CF_3)_2OCO_2-tert-C_4H_9$ or $CH_2=CHCH_2C(CF_3)_2OCH(CH_3)OC_2H_5$, may, for example, be mentioned.

The molecular weight of the fluoropolymer having a cyclic structure is not particularly limited so long as it is uniformly soluble in an organic solvent as described hereinafter and is uniformly coated on a substrate. However, usually the number average molecular weight as calculated as polystyrene is appropriately from 1,000 to 100,000, preferably from 2,000 to 20,000. If the number average molecular weight is less than 1,000, the obtained resist pattern may be impaired, the film-remaining rate after development may decrease, or the shape stability at the time of pattern heat treatment may decrease. Further, if the number average molecular weight exceeds 100,000, the coating properties of a composition may be poor, or the development properties may decrease.

The fluoropolymer of the present invention can be obtained by homopolymerizing or copolymerizing the above monomer in the presence of a polymerization initiating source. Otherwise, the fluoropolymer can be obtained by producing a fluoropolymer by using a corresponding monomer which is not blocked, and blocking the acidic group in the fluoropolymer with a blocking agent. The polymerization initiating source is not particularly limited so long as it is capable of letting the polymerization reaction proceed radically, and it may, for example, be a radical-generating agent, light or ionizing radiation. A radical-generating agent is particularly preferred, and it may, for example, be a peroxide, an azo compound or a persulfate.

The polymerization method is also not particularly limited, and it may, for example, be so-called bulk polymerization wherein a monomer is subjected to polymerization as it is, solution polymerization which is carried out in a fluorohydrocarbon, a chlorohydrocarbon, a fluorochlorohydrocarbon, an alcohol, a hydrocarbon or other organic solvent, in which the monomer is dissolved, a suspension polymerization which is carried out in an aqueous medium in the absence or presence of a suitable organic solvent, or emulsion polymerization which is carried out in an aqueous medium in the presence of an emulsifier.

The polymerization temperature and pressure are also not particularly limited, but it is preferred to properly set them taking into consideration various factors such as the boiling point of the monomer, the prescribed heating source, removal of the polymerization heat, etc. For example, a suitable temperature setting can be carried out between 0° C. to 200° C., and practically suitable temperature setting can be carried out within a range of from room temperature to 100° C. Further, the polymerization pressure may be a reduced pressure or an elevated pressure, and practically, the polymerization can properly be carried out within a range of from normal pressure to about 100 atm, preferably from normal pressure to about 10 atm.

The fluoropolymer obtained by the present invention has a cyclic structure in its main chain and has high chemical stability and heat resistance. Yet, functional groups are introduced in the side chains of the cyclic structure, whereby it is possible to exhibit sufficient characteristics of functional groups without bringing about a decrease of Tg, which used to be difficult to accomplish with conventional fluoropolymers. The fluoropolymer of the present invention is useful for e.g. an ion exchange resin, an ion exchange membrane, a fuel cell, various cell materials, a photoresist, an optical fiber, an electronic component, a transparent film material, a covering film for an agricultural green house, an adhesive, a fiber material, a weather-resistant coating material, etc.

The following compounds may be mentioned as specific examples of the fluorinated diene (1) of the present invention, but the present invention is not limited to such specific examples.

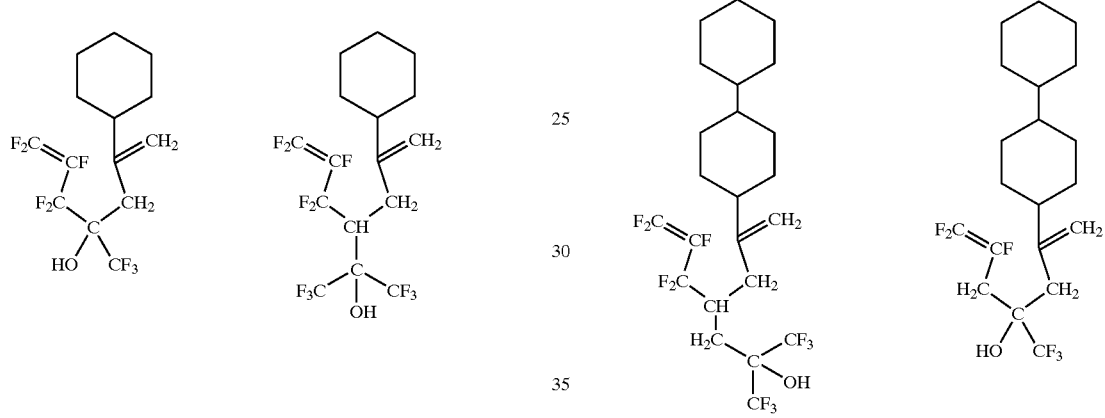

-continued

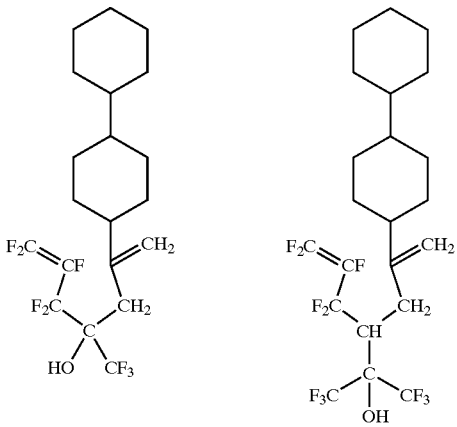

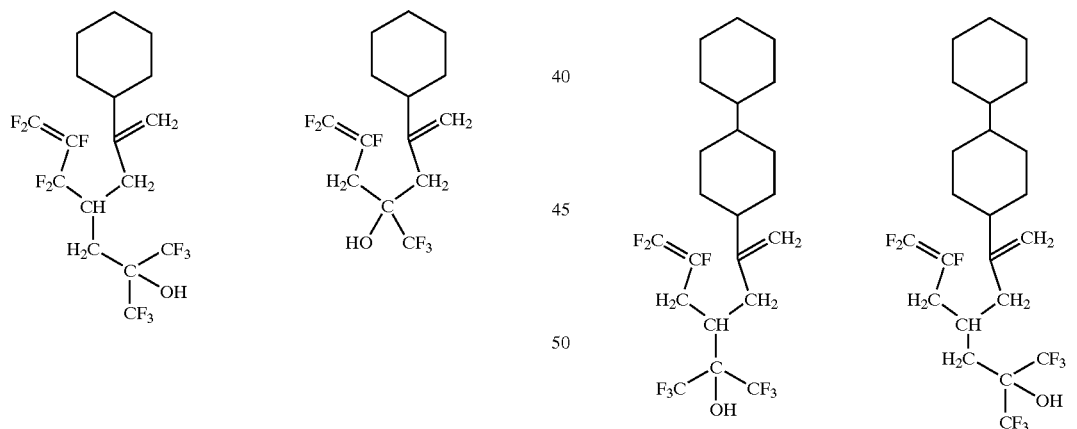

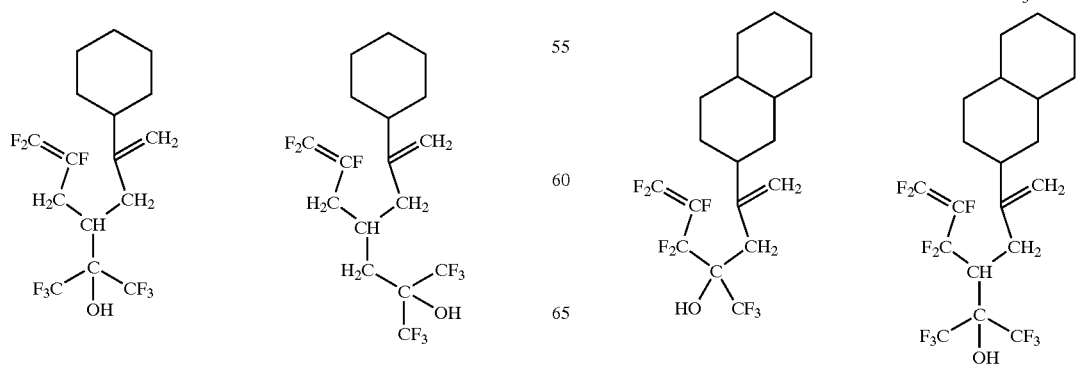

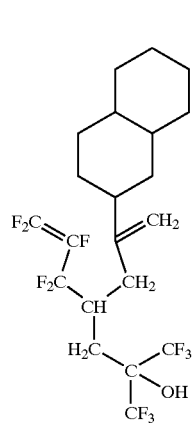
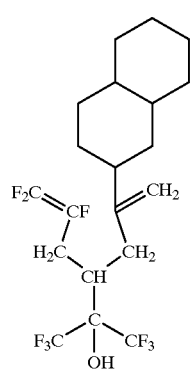
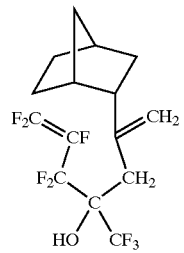
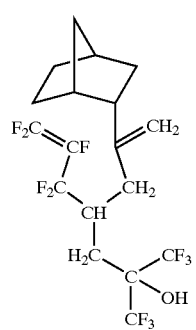
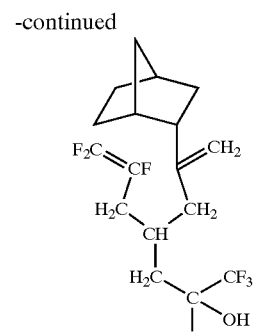
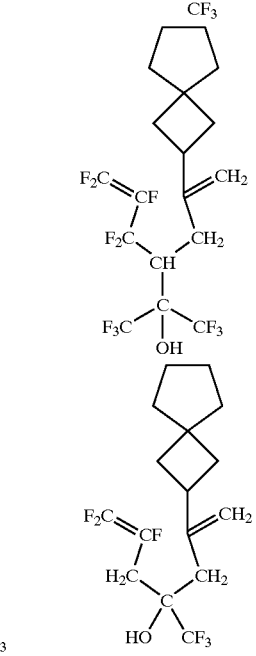
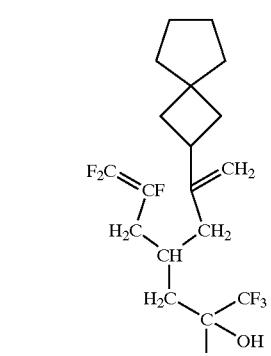
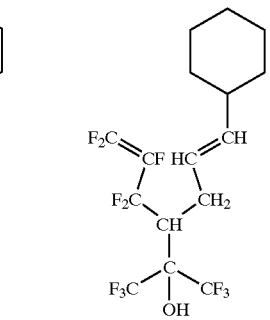

-continued
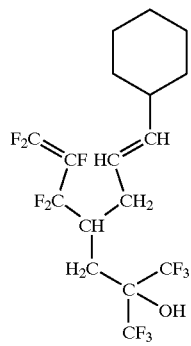 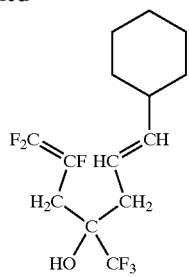
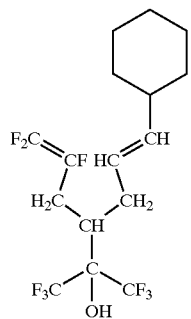 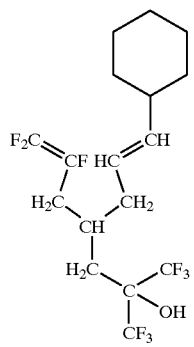
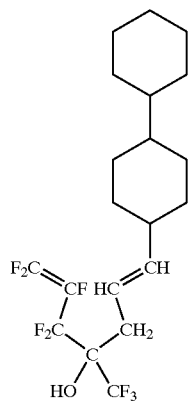 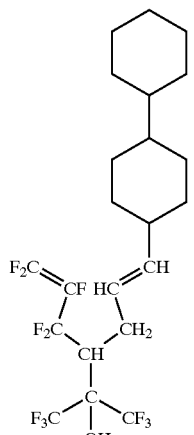
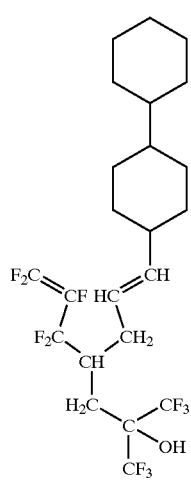 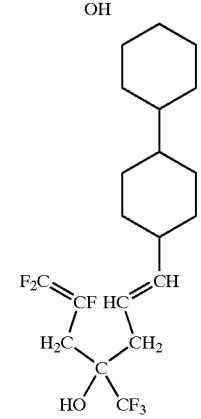
-continued
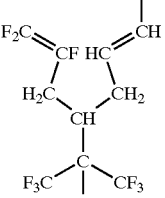 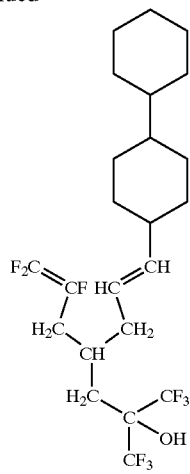
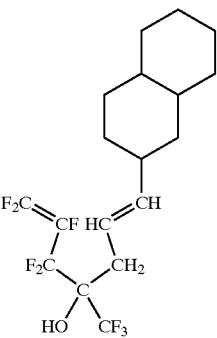 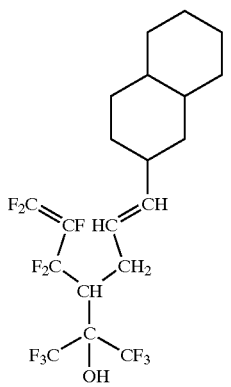
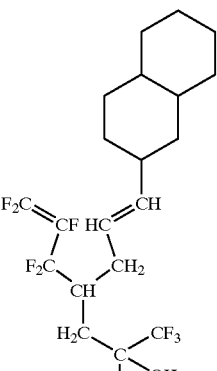 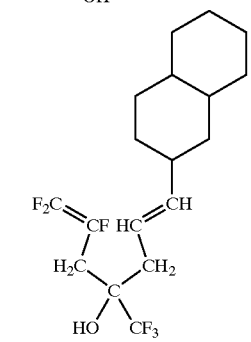

-continued

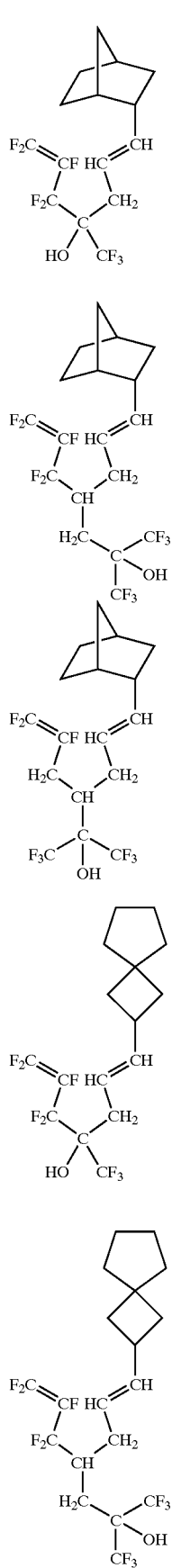

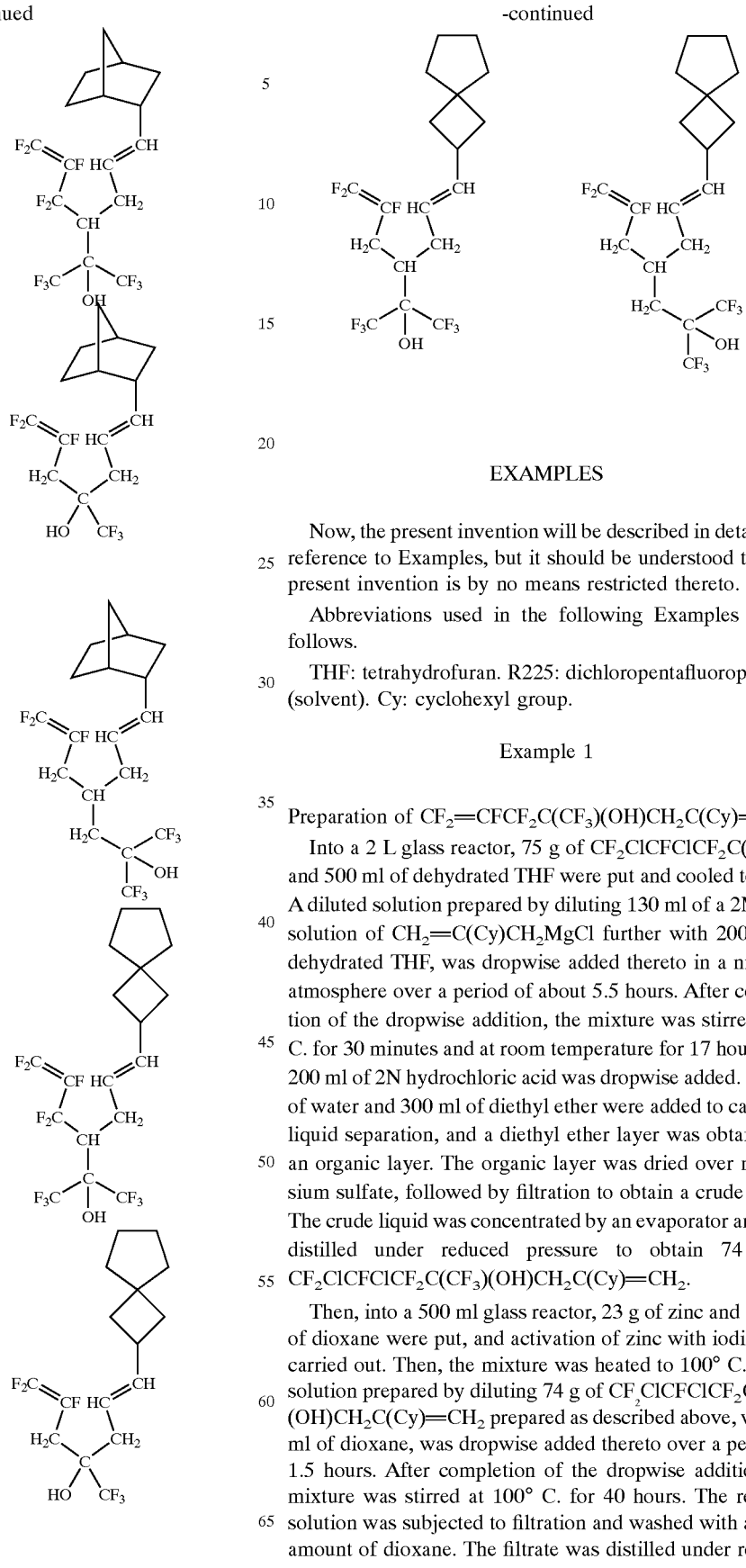

EXAMPLES

Now, the present invention will be described in detail with reference to Examples, but it should be understood that the present invention is by no means restricted thereto.

Abbreviations used in the following Examples are as follows.

THF: tetrahydrofuran. R225: dichloropentafluoropropane (solvent). Cy: cyclohexyl group.

Example 1

Preparation of $CF_2$=$CFCF_2C(CF_3)(OH)CH_2C(Cy)$=$CH_2$

Into a 2 L glass reactor, 75 g of $CF_2ClCFClCF_2C(O)CF_3$ and 500 ml of dehydrated THF were put and cooled to 0° C. A diluted solution prepared by diluting 130 ml of a 2M THF solution of $CH_2$=$C(Cy)CH_2MgCl$ further with 200 ml of dehydrated THF, was dropwise added thereto in a nitrogen atmosphere over a period of about 5.5 hours. After completion of the dropwise addition, the mixture was stirred at 0° C. for 30 minutes and at room temperature for 17 hours, and 200 ml of 2N hydrochloric acid was dropwise added. 200 ml of water and 300 ml of diethyl ether were added to carry out liquid separation, and a diethyl ether layer was obtained as an organic layer. The organic layer was dried over magnesium sulfate, followed by filtration to obtain a crude liquid. The crude liquid was concentrated by an evaporator and then distilled under reduced pressure to obtain 74 g of $CF_2ClCFClCF_2C(CF_3)(OH)CH_2C(Cy)$=$CH_2$.

Then, into a 500 ml glass reactor, 23 g of zinc and 170 ml of dioxane were put, and activation of zinc with iodine was carried out. Then, the mixture was heated to 100° C., and a solution prepared by diluting 74 g of $CF_2ClCFClCF_2C(CF_3)(OH)CH_2C(Cy)$=$CH_2$ prepared as described above, with 50 ml of dioxane, was dropwise added thereto over a period of 1.5 hours. After completion of the dropwise addition, the mixture was stirred at 100° C. for 40 hours. The reaction solution was subjected to filtration and washed with a small amount of dioxane. The filtrate was distilled under reduced pressure to obtain 43 g of $CF_2=CFCF_2C(CF_3)(OH)CH_2C(Cy)=CH_2$.

IR spectrum: 3350 cm$^{-1}$ (OH), 1250 cm$^{-1}$ (C—F)

Example 2

In Example 1, by using various Grignard reagents instead of $CH_2=C(Cy)CH_2MgCl$, the following compounds can be obtained:

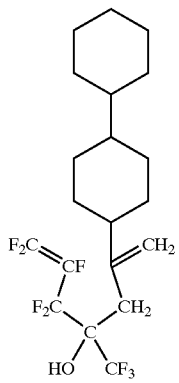
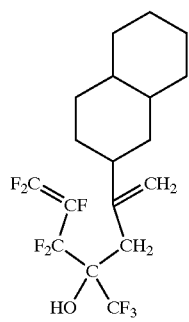
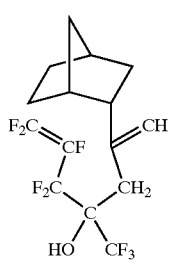
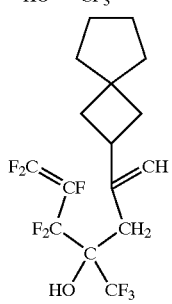
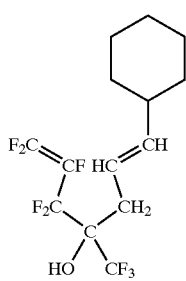
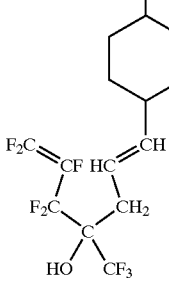
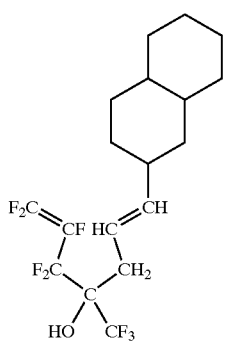
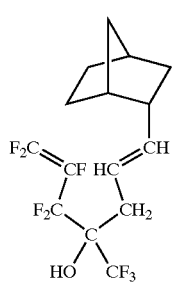
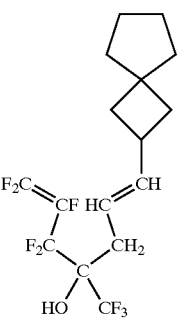

Example 3

10 g of the monomer obtained in Example 1 and 23 g of methyl acetate were charged into a pressure resistant reactor of 50 cc inner volume, made of glass. Then, 0.24 g of perfluorobenzoyl peroxide was added as a polymerization initiator. The interior of the system was freeze-deaerated. Then, the tube was sealed, followed by polymerization for 6 hours in a constant temperature shaking bath (70° C.). After the polymerization, the reaction solution was dropped into hexane to reprecipitate the polymer, followed by vacuum drying at 150° C. for 12 hours. As a result, 8 g of a non-crystalline polymer was obtained. As a result of analysis, the polymer was found to have a fluorinated cyclic structure in its main chain, as shown below. The obtained polymer was soluble in acetone, THF, ethyl acetate, methanol and 2-perfluorohexyl ethanol, and insoluble in R225, perfluoro(2-butyltetrahydrofuran) and perfluoro-n-octane:

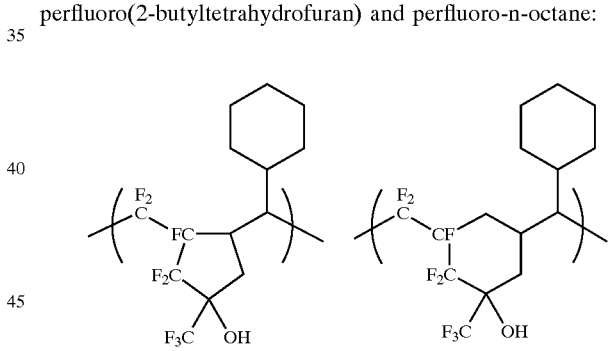

INDUSTRIAL APPLICABILITY

According to the present invention, by subjecting a monomer having two terminal double bonds and a functional group in a side chain of the connecting chain, to radical polymerization, it is possible to smoothly and advantageously obtain the desired cyclized fluoropolymer having functional groups in side chains of the cyclic structure while suppressing side reaction for gelation. The fluoropolymer obtained by the present invention has a cyclic structure in its main chain and has high chemical stability and heat resistance. Besides, functional groups are introduced in the side chains of the cyclic structure, whereby adequate characteristics of the functional groups can be provided without bringing about a decrease of Tg, which used to be difficult to accomplish with conventional fluoropolymers. The fluoropolymer of the present invention is useful for e.g. an ion exchange resin, an ion exchange membrane, a fuel cell, various cell materials, a photoresist, an optical fiber, an electronic component, a transparent film material, a covering film for an agricultural green house, an adhesive, a fiber material, a weather-resistant coating material, etc.

The entire disclosure of Japanese Patent Application No. 2002-240009 filed on Aug. 21, 2002 including specification, claims and summary is incorporated herein by reference in its entirety.

What is claimed is:

1. A fluoropolymer having monomer units formed by cyclopolymerization of a fluorinated diene represented by the formula (1):

$$CFR^1=CR^2\text{-}Q\text{-}CR^3=CHR^4 \quad (1)$$

wherein each of $R^1$, $R^2$, $R^3$ and $R^4$ which are independent of one another, represents a hydrogen atom, a fluorine atom, an alkyl group having at most 8 carbon atoms, or an alicyclic hydrocarbon group, and at least one of them is an alicyclic hydrocarbon group, provided that part of carbon atoms in the alkyl group or the alicyclic hydrocarbon group may be substituted by a hetero atom or a carbonyl group, and part of hydrogen atoms in the alkyl group or the alicyclic hydrocarbon group may be substituted by a fluorine atom, an alkyl group or a fluoroalkyl group; and Q represents a bivalent organic group having a blocked acidic group capable of developing an acidic group by an acid or a group capable of being converted into such a blocked acidic group.

2. The fluoropolymer according to claim 1, wherein each of $R^1$, $R^2$ and $R^4$ which are independent of one another, is a hydrogen atom, a fluorine atom, a methyl group or a trifluoromethyl group, and $R^3$ is an alicyclic hydrocarbon group.

3. The fluoropolymer according to claim 1, wherein each of $R^1$, $R^2$ and $R^3$ which are independent of one another, is a hydrogen atom, a fluorine atom, a methyl group or a trifluoromethyl group, and $R^4$ is an alicyclic hydrocarbon group.

4. The fluoropolymer according to claim 1, wherein Q is a bivalent organic group represented by the following formula (2):

$$-R^5-C(R^6)(R^7)-R^8- \quad (2)$$

wherein each of $R^5$ and $R^8$ which are independent of each other, represents a single bond, an oxygen atom, an alkylene group having at most 3 carbon atoms which may have an ethereal oxygen atom or a fluoroalkylene group having at most 3 carbon atoms which may have an ethereal oxygen atom, $R^6$ represents a hydrogen atom, a fluorine atom, an alkyl group having at most 3 carbon atoms or a fluoroalkyl group having at most 3 carbon atoms, and $R^7$ represents a blocked acidic group, an acidic group, or a monovalent organic group having a blocked acidic group or an acidic group.

5. The fluoropolymer according to claim 1, wherein the acidic group is an acidic hydroxyl group, and the blocked acidic group is a blocked acidic hydroxyl group.

6. A fluoropolymer having monomer units formed by cyclopolymerization of a fluorinated diene represented by the formula (3):

$$CF_2=CFCF_2C(CF_3)(OR^9)-CH_2-CR^{10}=CH_2 \quad (3)$$

wherein $R^9$ is a hydrogen atom, an alkyl group having at most 10 carbon atoms, which may have an ethereal oxygen atom or an alicyclic hydrocarbon group, or an alkoxycarbonyl group having at most 6 carbon atoms, and $R^{10}$ represents an alicyclic hydrocarbon group.

7. A fluoropolymer having monomer units formed by cyclopolymerization of a fluorinated diene represented by the formula (4):

$$CF_2=CFCF_2C(CF_3)(OR^9)-CH_2-CH=CHR^{10} \quad (4)$$

wherein $R^9$ is a hydrogen atom, an alkyl group having at most 10 carbon atoms, which may have an ethereal oxygen atom or an alicyclic hydrocarbon group, or an alkoxycarbonyl group having at most 6 carbon atoms, and $R^{10}$ represents an alicyclic hydrocarbon group.

8. A fluoropolymer having monomer units formed by cyclopolymerization of a fluorinated diene represented by the formula (5):

$$CF_2=CFCH_2CH((CH_2)_pC(CF_3)_2(OR^9))-CH_2-CR^{10}=CH_2 \quad (5)$$

wherein $R^9$ is a hydrogen atom, an alkyl group having at most 10 carbon atoms, which may have an ethereal oxygen atom or an alicyclic hydrocarbon group, or an alkoxycarbonyl group having at most 6 carbon atoms, p represents an integer of from 1 to 3, and $R^{10}$ represents an alicyclic hydrocarbon group.

9. A fluoropolymer having monomer units formed by cyclopolymerization of a fluorinated diene represented by the formula (6):

$$CF_2=CFCH_2CH((CH_2)_pC(CF_3)_2(OR^9))-CH_2-CH=CHR^{10} \quad (6)$$

wherein $R^9$ is a hydrogen atom, an alkyl group having at most 10 carbon atoms, which may have an ethereal oxygen atom or an alicyclic hydrocarbon group, or an alkoxycarbonyl group having at most 6 carbon atoms, p represents an integer of from 1 to 3, and $R^{10}$ represents an alicyclic hydrocarbon group.

10. A process for producing a fluoropolymer, which comprises cyclopolymerizing a functional group-containing fluorinated diene represented by the following formula (1):

$$CFR^1=CR^2\text{-}Q\text{-}CR^3=CHR^4 \quad (1)$$

wherein each of $R^1$, $R^2$, $R^3$ and $R^4$ which are independent of one another, represents a hydrogen atom, a fluorine atom, an alkyl group having at most 8 carbon atoms, or an alicyclic hydrocarbon group, and at least one of them is an alicyclic hydrocarbon group, provided that part of carbon atoms in the alkyl group or the alicyclic hydrocarbon group may be substituted by a hetero atom or a carbonyl group, and part of hydrogen atoms in the alkyl group or the alicyclic hydrocarbon group may be substituted by a fluorine atom, an alkyl group or a fluoroalkyl group; and Q represents a bivalent organic group having a blocked acidic group capable of developing an acidic group by an acid or a group capable of being converted into such a blocked acidic group.

* * * * *